United States Patent Office 3,639,519
Patented Feb. 1, 1972

3,639,519
PROCESS FOR PREPARING BLOCK COPOLYMERS BY REACTING LACTONE WITH A POLYMER
Henry L. Hsieh, Bartlesville, Okla., and Francis X. Mueller, Jr., Louisville, Ky., assignors to Phillips Petroleum Company
No Drawing. Continuation-in-part of application Ser. No. 679,991, Nov. 2, 1967. This application May 2, 1968, Ser. No. 726,241
Int. Cl. C08f 15/04, 17/02, 19/02
U.S. Cl. 260—880
6 Claims

ABSTRACT OF THE DISCLOSURE

A copolymer is formed by providing a polymer having at least one

group wherein M is an alkali metal such as lithium, reacting the polymer with one of an alkene oxide such as ethylene oxide, an aldehyde such as propanal, an epoxyaldehyde such as 2,3-epoxypropanal, a polyaldehyde such as 1,3,5-trioxane, a ketone such as 2-butanone, and an epoxy ketone such as 2,3-epoxy-5-hexanone, and contacting at least the reaction product thereof with at least one lactone such as epsilon-caprolactone to polymerize the lactone and form a lactone polymer block on the first provided polymer.

---

This in a continuation-in-part of U.S. application Ser. No. 679,991, filed Nov. 2, 1967.

This invention relates to a new and improved method for making copolymers such as block or graft copolymers.

Heretofore, block copolymers of monomers such as conjugated dienes and monovinyl substituted aromatic compounds have been formed using organo-lithium initiators.

It has now been found that copolymers, including both block and graft copolymers, can be formed from a polymer which contains at least one

group, wherein M is an alkali metal atom and C is a carbon atom, by first reacting the polymer with one of an alkene oxide having one or more oxirane groups, an aldehyde, epoxyaldehyde, a polyaldehyde, a ketone, and an epoxyketone, and thereafter contacting at least the thus formed reaction product with at least one lactone under polymerization conditions for the lactone. By this procedure at least one lactone polymer is formed on the first provided (base) polymer thereby producing the final copolymer.

Quite surprisingly, it has been found that by the above procedure conversions of 75, preferably 90, percent or more to the final copolymer are obtained which was not possible at conventional low catalyst levels, i.e., no greater than 6 gram millimoles of initiator per 100 grams of monomer(s) to be polymerized, and without the use of the alkene oxide, aldehyde, epoxyaldehyde, polyaldehyde, ketone, or epoxyketone reaction step.

By this invention a polymer can be converted to a block or graft copolymer or a block or graft copolymer can be formed by first polymerizing one or more monomers in a manner such that the resulting homopolymer or copolymer contains one or more of the

group and this resulting homopolymer or copolymer then converted to the desired final copolymer described above.

The copolymers produced by the method of this invention are useful as leather substitutes in that they are tough and leather-like in character but are also suitable for applications in both rubber and plastics fields. Specific uses for the block copolymers of this invention include floor mats, rubber hose, bottles, food trays, bowls, and the like.

Accordingly, it is an object of this invention to provide a new and improved method for making a copolymer such as a block or graft copolymer.

Other aspects, objects, and advantages of this invention will be apparent to those skilled in the art from the description and appended claims.

According to this invention substantially any polymer which contains at least one

group per polymer molecule wherein M is an alkali metal, preferably lithium, can be employed. The

group can be carried on the end of the polymer molecules, i.e., be terminal, or along the length of that molecule, i.e., intermediate, or both if more than one such group is present on a single polymer molecule. If more than one such group is present, they also can be all terminal or all intermediate as well as mixed. A preformed base polymer can be provided and then converted to the final copolymer or the final copolymer formation process can start with the formation of the base polymer which, when formed, is converted to the desired final copolymer. The final copolymer can have a block structure if a terminal

group is present or a graft structure if an intermediate

group is present or a mixture of such structures if a mixture of terminal and intermediate groups is present.

The base polymer can be formed in any conventional manner from any known monomer or combination of monomers so long as the resulting polymer molecules contain the required

group. The base polymer molecules can contain one or more of these groups depending upon the method by which the base polymer is formed. One suitable base polymer is a homopolymer or copolymer of two or more monomers, formed from monomers selected from the group consisting of conjugated dienes having 4 to 12 carbon atoms per molecule, inclusive, and monovinyl substituted aromatic compounds having 8 to 12 carbon atoms per molecule, inclusive. Suitable conjugated dienes include 1,3-butadiene, isoprene, piperylene, 6-phenyl-1,3-hexadiene, and the like. Suitable monovinyl substituted aromatic compounds include styrene, 3-methylstyrene, 4-methylstyrene, 4-isopropylstyrene, 2,4-dimethylstyrene, 1-vinylnaphthalene, 2-vinylnaphthalene, alkyl derivatives thereof, and the like. The base polymer can be a homopolymer of a conjugated diene or a monovinyl substituted aromatic compound or a random or block copolymer of 2 or more conjugated dienes or 2 or more monovinyl substituted aromatic compounds or a mixture of at least one conjugated diene and at least one monovinyl substituted aromatic compound.

These monomers can be polymerized using organoalkali metal compounds as initiators. A preferred initiator is that which corresponds to the formula $R^VLi_x$, wherein $R^V$ is a hydrocarbon radical selected from the group consisting of aliphatic, cycloaliphatic and aromatic radicals and combinations thereof and $x$ is an integer from 1 to 4, inclusive. The $R^V$ in the formula has a valence equal to the integer $x$, and preferably contains from 1 to 20, inclusive, carbon atoms, although it is within the scope of this invention to use higher molecular weight compounds. Examples of these compounds include methyllithium,
isopropyllithium,
n-butyllithium,
tert-octyllithium,
n-decyllithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithio-2-butene,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,3,5-tetralithiocyclohexane,
1,2,3,5-tetralithio-4-hexylanthracene, dilithio adducts of 2,3-dialkyl-1,3-butadiene, preferably the dilithium adducts of 2,3-dimethyl-1,3-butadiene and dilithium adducts of butadiene and isoprene containing from 1 to 10 diene units per molecule, and the like. The polymerization procedures for the above monomers and initiators are well known and therefore will not be described here in detail but suitable procedures can be found in British Patent 817,693, and U.S. Patent 2,975,160, the disclosures of both of which are hereby incorporated herein by reference.

Preformed polymers of various monomers including the conjugated dienes and monovinyl substituted aromatic compounds disclosed hereinabove can be converted to a polymer containing the requisite

groups by other procedures known in the art. For example, a hydrocarbon polymer (e.g., polybutadiene) containing either allylic or benzylic hydrogen atoms can be metallated with an alkyllithium compound (e.g., n-butyllithium) by reacting the polymer with the alkyllithium at a temperature in the range of 25–200° C. for from 2 minutes to 50 hours thereby providing base polymer having one or more intermediate

groups per polymer molecule.

The base polymer, whether preformed or formed in situ, is then reacted with an oxirane compound containing from 1 to 10, inclusive, oxirane groups. Suitable oxirane compounds include compounds of the formula

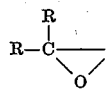

wherein each R and each R' is selected from the group consisting of hydrogen, halogen (preferably chlorine, bromine, and iodine), alkyl, aryl, alkaryl, aralkyl and cycolalkyl radicals and one R and one R' can together form an alkylene radical. Other suitable compounds are represented by the formula

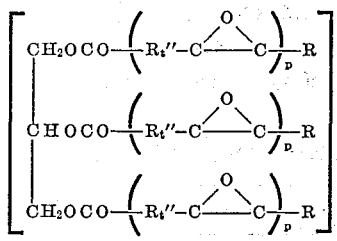

where R" is an alkylene radical having from 1 to 10 carbon atoms, inclusive, $t$ is an integer 0 or 1 and when $t$ is 1 R" is an alkylene radical, $p$ is an integer from 1 to 5, $q$ is an integer from 0 to 5, and the compound contains no more than 60 carbon atoms per molecule. The oxirane compounds employed have from 2 to 60 carbon atoms per molecule.

Suitable oxirane compounds include epichlorohydrin,
ethylene oxide,
propylene oxide (1,2-epoxypropane),
butylene oxide (1,2-epoxybutane and 2,3-epoxybutane),
1,2-epoxypentane,
1,2-epoxy-3-methylbutane,
2,3-epoxy-3-methylbutane,
1,2-epoxy-2,3,4-trimethylpentane,
1,2-epoxycyclohexane,
1,2-epoxycyclooctane,
1,2-epoxy-4-cyclohexylpentane,
1,2-epoxyoctadecane,
1,2-epoxyeicosane,
styrene oxide,
1,2-epoxytriacontane,
1,2-epoxy-2-cyclohexylbutane,
3,4-epoxy-3,4-diethylhexane,
3,4-epoxy-3-ethyl-4-phenylhexane,
1,2-epoxy-2-(p-tolyl)butane,
2,3-epoxy-3-methyl-2-benzylpentane,
1-bromo-2,3-epoxypropane,
1,5-dichloro-2,3-epoxypentane,
2-iodo-3,4-epoxybutane,
2,3:5,6-diepoxyhexahydro-4,7-methanoindane,
1,2:8,9-diepoxy-p-menthane,
1,2:4,5:7,8-triepoxyoctane,
1,2:4,5:7,8:10,11:13,14:16,17-hexaepoxyeicosane,
glycerol,
1-(9,10:12,13:15,16-triepoxyoctadecanoate)-2-(9,10:12,13-diepoxyoctadecanoate)-3-(9,10-epoxyoctadecanoate),
glycerol, tris(9,10:12,13:15,16-triepoxyoctadeconate), glycerol tris(9,10:12,13-diepoxyoctadecanoate),
glycerol, tris(9,10-epoxyoctadecanoate),
and the like.

The base polymer, whether preformed or formed in situ, can, instead of being reacted with an oxirane compound, be reacted with an aldehyde, epoxyaldehyde, polyaldehyde, ketone, or epoxyketone.

The aldehydes that can be employed are represented by the formula

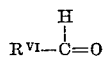

wherein $R^{VI}$ is selected from the group consisting of hydrogen, aliphatic, cycloaliphatic, and aromatic hydrocarbon radicals, and combinations thereof such as alkaryl, aralkyl, and the like, the radicals and combinations thereof containing from 1 to 20, inclusive, carbon atoms, $R^{VI}$ is preferably hydrogen or an aliphatic radical containing from 1 to 10, inclusive, carbon atoms.

Suitable aldehydes include benzaldehyde, acetaldehyde, decanal, eicosanal, 2-phenylbutanal, propanal, cyclohexanecarboxaldehyde, pentanal, 3-phenylcyclohexanecarboxaldehyde, 3-methylbenzaldehyde, 4-cyclohexylbenzaldehyde, formaldehyde and the like.

Epoxyaldehydes that can be employed in this invention are cyclic or acyclic compounds which have 3 to 20, inclusive, carbon atoms per molecule, have 1 to 6 inclusive, oxirane groups, i.e.,

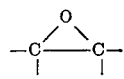

per molecule, and have 1 to 6, inclusive, formyl groups, i.e.,

per molecule.

Examples of suitable epoxyaldehydes include glycidaldehyde (2,3-epoxypropanal),
2,3-epoxycyclohexanecarboxaldehyde,
2,3-epoxybutanal,
2,3-epoxyeicosanal,
2,3;5,6;8,9;11,12;14,15;17,18-hexaepoxyeicosanal,
2,3-epoxy-1,4,5,7,9,11-tridecanehexacarboxaldehyde,
2-benzyl-8-phenyl-3,4;6,7-diepoxy-1,2,8-
  nonanetricarboxaldehyde,
4,5;6,7-diepoxy-1,2-cyclooctanedicarboxaldehyde,
3-phenyl-2,3-epoxypropanal,
4,4-dicyclohexyl-2,3-epoxybutanal,
5-phenyl-3,4-epoxycyclohexanecarboxaldehyde, and the like.

The polyaldehyde employed can be polymers of the aldehydes set forth hereinabove having the formula

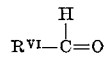

which polymers are cyclic or linear and which polymers contain from 2 to 10, inclusive, aldehyde molecules per polymer molecule.

Examples of suitable polyaldehydes include dimers, trimers, tetramers, and higher polymers of the aldehydes such as 1,3,5-trioxane, 2,4,6-triethyl-1,3,5-trioxane, and 2,4,6-trimethyl-1,3,5-trioxane.

Ketones which can be employed in this invention can be represented by the formula

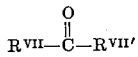

wherein $R^{VII}$ and $R^{VII'}$ are selected from the group consisting of aliphatic, cycloaliphatic, and aromatic hydrocarbon radicals, and combinations thereof such as alkaryl and aralkyl and the like, the total number of carbon atoms in each $R^{VII}$ and $R^{VII'}$ group being from 1 to 20, inclusive, carbon atoms, and the total number of carbon atoms in the ketone being 3 to 21, inclusive, carbon atoms, and one $R^{VII}$ and one $R^{VII'}$ can together form an alkylene radical.

Examples of suitable ketones are acetone, 11-heneicosanone, acetophenone, benzophenone, acetylcyclohexane, cyclopentyl ketone, 1 - cyclooctyl - 2 - methyl - 1-butanone, 1 - phenyl - 5 - cyclohexyl - 3 - pentanone, 2-butanone, 3 - decanone, 2,4-dimethyl-3-heptanone, cyclohexanone, cyclododecanone, 3-phenylcyclooctanone, cyclopentanone and the like.

Epoxy ketones that can be employed in this invention are cyclic or acyclic compounds which have 4 to 20, inclusive, carbon atoms per molecule, have 1 to 6, inclusive, carbonyl groups per molecule, and have 1 to 6, inclusive, oxirane groups per molecule.

Suitable examples of epoxyketones include 2,3-epoxy-5-hexanone,
2,3;4,5-diepoxycyclooctanone,
2,3-epoxy-4,6,8,10,12,14-eicosanehexanone,
3,4;6,7;9,10;12,13;15,16;18,19-hexaepoxy-2-eicosanone,
2-phenyl-4,5-epoxy-3-decanone,
2-cyclopentyl-4,5-epoxy-6-phenyl-3-heptanone,
3,4-epoxy-2-butanone,
1,2-epoxy-3,6-octandione
and the like.

The aldehydes, epoxyaldehydes, polyaldehydes, ketones, and epoxyketones set forth hereinabove are known in the art as to their existence and procedures for preparing same, and are commercially available.

Thereafter, at least the reaction product of the base polymer and the oxirane compound, aldehyde, epoxyaldehyde, polyaldehyde, ketone or epoxyketone, is contacted with at least one lactone of the formula

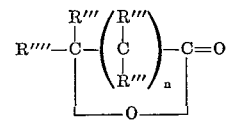

wherein $R''''$ is one of hydrogen and a radical of the formula

and when $R''''$ is a radical as specified no $R'''$ is attached to the carbon atom to which the radical is attached, wherein $R'''$ is one of hydrogen, alkyl, cycloalkyl, alkenyl and cycloalkenyl and aryl and combinations thereof, wherein the total carbon atoms in the $R'''$ and $R''''$ substituents being in the range of 1 to 12, and wherein $n$ being an integer which can be 1, 3, or 4.

Suitable lactones include beta-propiolactone, delta-valerolactone, epsilon-caprolactone, and lactones corresponding to the following acids:

2-methyl-3-hydroxypropionic acid,
3-hydroxynonanoic or 3-hydroxypelargonic acid,
2-dodecyl-3-hydroxypropionic acid,
2-cyclopentyl-3-hydroxypropionic acid,
3-phenyl-3-hydroxypropionic acid,
2-naphthyl-3-hydroxypropionic acid,
2-n-butyl-3-cyclohexyl-3-hydroxypropionic acid,
2-phenyl-3-hydroxytridecanoic acid,
2-(2-methylcyclopentyl)-3-hydroxypropionic acid,
2-methylphenyl-3-hydroxypropionic acid,
3-benzyl-3-hydroxypropionic acid,
2,2-dimethyl-3-hydroxypropionic acid,
2-methyl-5-hydroxyvaleric acid,
3-cyclohexyl-5-hydroxyvaleric acid,
4-phenyl-5-hydroxyvaleric acid,
2-heptyl-4-cyclopentyl-5-hydroxyvaleric acid,
2-methyl-3-phenyl-5-hydroxyvaleric acid,
3-(2-cyclohexylethyl)-5-hydroxyvaleric acid,
2-(2-phenylethyl)-4-(4-cyclohexylbenzyl)-5-hydroxyvaleric acid,
4-benzyl-5-hydroxyvaleric acid,
3-ethyl-5-isopropyl-6-hydroxycaproic acid,
2-cyclopentyl-4-hexyl-6-hydroxycaproic acid,
3-phenyl-6-hydroxycaproic acid, 3-(3,5-diethyl-cyclohexyl)-5-ethyl-6-hydroxycaproic acid,
4-(3-phenylpropyl)-6-hydroxycaproic acid,
2-benzyl-5-isobutyl-6-hydroxycaproic acid,
7-phenyl-6-hydroxy-6-octenoic acid,
2,2-di(1-cyclohexenyl)-5-hydroxy-5-heptenoic acid,
2,2-dipropenyl-5-hydroxy-5-heptenoic acid,
2,2-dimethyl-4-propenyl-3-hydroxy-3,5-heptadienoic acid,
and the like.

The final product copolymers of this invention can vary widely as to their composition. For example, the copolymers can contain from about 1 to about 99 weight percent of one or more lactones based upon the total weight of the monomers used to make the base polymer and the lactone or lactones employed to make up the lactone polymer portion. Accordingly, the monomer or monomers used to make up the base polymer can be present in the final copolymer in the amount of from about 1 to about 99 weight percent based upon the total weight of those monomers and the lactone or lactones used to make up the lactone polymer portion. The base polymer can be a rubbery homopolymer of a conjugated diene, a homopolymer of a monovinyl substituted aromatic compound, or a rubbery or resinous copolymer of a conjugated diene and a monovinyl substituted aromatic compound which copolymer can contain any proportion of the monovinyl substituted aromatic compound.

From the above it can be seen that the base polymer can comprise from about 1 to about 99 weight percent of the final block copolymer based upon the total weight of the final product copolymer, the remainder being substantially the lactone polymer portion. Thus, the final copolymer can contain from about 1 to about 99 weight percent lactone polymer block based on the total weight of the final copolymer.

When forming the base polymer in situ using an organoalkali metal initiator, the amount of initiator employed should be in the range of from about 0.5 to about 20, preferably from about 1 to about 6, gram millimoles per 100 grams of monomers to be polymerized on the base polymer. After the base polymer is formed, the oxirane compound and the lactone or lactones to be polymerized can both be charged to the polymerization mixture of the base polymer. The oxirane compound can be charged first or together with the lactone or lactones to be polymerized.

In the process of this invention, the mole ratio of the oxirane compound, aldehyde, epoxyaldehyde, polyaldehyde, ketone, and epoxyketone employed to gram atoms of alkali metal in the initiator if the base polymer is formed in situ or alkali metal in the base polymer if preformed, should be at least 0.1/1, preferably at least 1/1. Substantially any excess of oxirane and other compounds can be used even up to 500 moles or more per gram atom of alkali metal in the initiator or base polymer. However, an upper practical maximum is 10, preferably 5, moles. A presently preferred range of mole ratios of oxirane compound, aldehyde, epoxyaldehyde, polyaldehyde, ketone, and epoxyketone to gram atoms of alkali metal employed in the initiator or base polymer is from about 0.5/1 to about 10/1. A more preferred range of mol ratio of oxirane and other compounds to gram atoms of alkali metal employed in the initiator or base polymer is from about 0.5/1 to about 5/1.

The oxirane compound, aldehyde, epoxyaldehyde, polyaldehyde, ketone or epoxyketone can be reacted with the base polymer under any reaction conditions such as elevated temperatures and pressures sufficient to maintain the reactants substantially in the liquid phase. Preferred reactor temperatures are from about −20 to about 300, preferably from about 30 to about 250° F. Reaction times can be from about 1 second to about 2 hours.

When the base polymer is formed in situ, the final copolymers of this invention can be formed by a two-step process. For example, a conjugated diene or a mixture of a conjugated diene and a monovinyl substituted aromatic compound can be charged first, together with an organolithium catalyst and a conventional hydrocarbon diluent such as cyclohexane. These monomers are then allowed to polymerize to essentially quantitative conversion to thereby form the base polymer. To this polymerization mixture is added an oxirane compound, aldehyde, epoxyaldehyde, polyaldehyde, ketone or epoxyketone followed by a lactone, a mixture of lactones, or successive increments of different lactones. Sufficient time is then allowed for formation of the lactone polymer portion.

The final copolymers of this invention can also be formed in a multi-step process wherein the base polymer is formed by sequential addition of different monomers in which each monomer is polymerized to essentially quantitative conversion prior to addition of the next monomer. An oxirane compound, aldehyde, epoxyaldehyde, polyaldehyde, ketone or epoxyketone is added to this polymerization mixture followed by a lactone, a mixture of lactones or successive increments of different lactones. Sufficient time is then allowed for formation of the lactone polymer portion.

The polymerization of the monomers to form the base polymer as well as the lactone to form the final copolymer can be carried out at substantially any operable temperature but will generally be in the range of from about −20 to about 300, preferably from about 30 to about 250° F. The polymerization pressures can also vary widely but will generally be that which is sufficient to maintain the reactants substantially in a liquid state. The pressures can be autogenous or elevated to the extent to which the apparatus employed can be operated. The polymerization time for both the base polymer and the lactone polymer block is temperature dependent. Sufficient time can be allowed in the formation of the base polymer for substantially complete conversion of the monomer. This time is generally in the range of from about 1 minute or less to about 100 hours or more. The same time considerations and ranges apply to the polymerization of the lactone in the second step of the process. The temperatures, times, pressures, and other operating conditions can be the same or different in making the base polymer and the lactone polymer portion. The polymerization times for making the base polymer and the lactone polymer can each be varied as desired to obtain the desired results of quantitative conversion of the monomers or any amount of conversion less than quantitative.

The formation of the base polymer, the reaction of the oxirane compound, aldehyde, epoxyaldehyde, polyaldehyde, ketone or epoxyketone with the base polymer, and the formation of the lactone polymer blocks can be carried out in the presence or absence of the diluent but it is preferred to employ diluents such as a hydrocarbon diluent selected from the group consisting of paraffins, cycloparaffins, and aromatic hydrocarbons containing 4 to 10 carbon atoms per molecule, inclusive, and mixtures thereof. Other diluents that can be employed are those which are inert to the reactants and products thereof under the conditions of the reaction and polymerization, for example ethers having 2 to 6 carbon atoms per molecule, inclusive, such as methyl ether, ethyl ether, dioxane, tetrahydrofuran, and the like. These other types of diluents can be employed alone or in admixture with one another or in admixture with hydrocarbon diluents, and the like.

The block copolymers of this invention can be recovered in any conventional manner such as by catalyst deactivation by the addition of alcohol or other known deactivating agents, separation of the polymer from solution such as by vaporization of the diluents thereby leaving the polymeric product, and drying the polymer. The block copolymers can be compounded in any conventional manner with conventional additives such as carbon black, pigments, antioxidants, and other known stabilizers.

The final copolymers of this invention when compounded and cured in gum stock recipe, can be made to vary from elastomeric to plastic (resinous), depending upon conjugated diene content thereof. The final copolymers of this invention can be compounded with various conventional additives such as carbon black and other fillers, antioxidants, ultraviolet light stabilizers, foaming agents, plasticizers, extruder oils, vulcanizing agents, vulcanization accelerators, and the like in a conventional manner. Depending upon whether conjugated dienes are employed in making the final copolymers of this invention, those copolymers can be made to contain residual unsaturation for subsequent curing and the like. Unsaturated final copolymers of this invention can be hydrogenated to reduce the amount of residual unsaturation and thereby increase the resistance of the block copolymers to attack by oxygen, ozone, and other oxidizing agents.

It should be noted that copolymers of two or more polymer blocks can be prepared by this invention. For example, a block terpolymer can be prepared comprising at least one polystyrene block, at least one polybutadiene block, and at least one polylactone block. Copolymers or homopolymers can be employed as blocks in the block copolymers of this invention.

EXAMPLE I

Runs were conducted for the production of block copolymers of butadiene and epsilon-caprolactone using n-butyllithium as the polymerization catalyst. The effect of terminating the butadiene polymerization with ethylene oxide prior to addition of the lactone was determined. A control run was made in which no ethylene oxide was used. The polymerization recipe was as follows in Table I:

TABLE I

Step 1:
  Cyclohexane, parts by weight _____ 780
  1,3-butadiene, parts by weight _____ 40
  n-Butyllithium, mhm.[1] _____ Variable
  Temperature, ° F. _____ 158
  Time, min. _____ 60
Step 2:
  Ethylene oxide, mhm.[1] _____ Variable
  Epsilon-caprolactone, parts by weight _____ 60
  Temperature, ° F. _____ 158
  Time, hours _____ 22

[1] mhm. means gram millimoles per 100 grams monomers in this example and in all other examples unless otherwise specified.

Cyclohexane was charged to the reactor first. It was then purged with nitrogen after which the butadiene was added and then the butyllithium. The temperature was adjusted to 158° F. and after 60 minutes, polymerization of the butadiene was essentially complete. The reaction mixture was cooled to room temperature. The ethylene oxide (when used) was added and then the caprolactone. The temperature was adjusted again to 158° F. and the mixture was agitated for 22 hours. The mixture was cooled and approximately one part by weight per 100 parts by weight polymer of 2,2'-methylene-bis(4-methyl-6-tert-butylphenol) was added as a 10 weight percent solution of the antioxidant in a mixture of equal parts by volume of isopropyl alcohol and toluene. The polymer was then coagulated in isopropyl alcohol, separated, and dried. Polymers from two of the runs were compounded in the following gum stock recipe:

TABLE II

| | Parts by weight |
|---|---|
| Polymer | 100 |
| Zinc oxide | 3 |
| Stearic acid | 2 |
| Sulfur | 1.75 |
| N-cyclohexyl-2-benzothiazolesulfenamide | 1 |

The stocks were cured 30 minutes at 307° F., and tensile strength and elongation were determined. The cured products were leathery in character. Results were as follows:

TABLE III

| Run No. | BuLi, mhm. | Ethylene oxide, mhm. | Conversion, percent[1] | Tensile,[2] p.s.i. | Elongation,[2] percent |
|---|---|---|---|---|---|
| 1 | 2.5 | 4 | 90 | | |
| 2 | 2.3 | 4 | 98 | 2,450 | 410 |
| 3 | 1.9 | 4 | 98 | 1,730 | 410 |
| 4 | 2.5 | 0 | 56 | | |

[1] Based on total monomers charged.
[2] ASTM D 412–62T.

It can be seen from the Table III that without the use of an alkene oxide a conversion of only 56 percent was obtained which means that with substantially complete conversion of the butadiene in step 1 of Table I, 40 parts, only 16 parts (56–40) of the 60 parts of the epsilon-caprolactone charged in step 2 of Table I was polymerized. However, by the use of ethylene oxide, the conversion was increased to 90 percent or more, runs 1–3 of Table III, thereby indicating that substantially all of the epsilon-caprolactone was polymerized when the ethylene oxide was used.

Thus, by reacting ethylene oxide with the unterminated polybutadiene formed in step 1 of Table I (unterminated polybutadiene formed using an alkyllithium initiator being known to those skilled in the art to contain at least one —C—Li group per polymer molecule, see U.S. Patent 3,135,716, column 3) the polymerization of the lactone was greatly aided causing almost a doubling of the final conversion based on the total monomers charged as reported in Table III.

EXAMPLE II

Block copolymers were prepared from butadiene and epsilon-caprolactone using n-butyllithium as the catalyst. Variable quantities of ethylene oxide were added after the butadiene was polymerized but before the caprolactone was introduced. The recipe and procedure were the same as in Example I except that the butyllithium level in all runs was 2.3 mhm. and the time for step 2 was 24 hours instead of 22 hours. Results were as follows:

TABLE IV

| Run No. | EO, mhm. | EO:BuLi, mole ratio | Conversion, percent[1] |
|---|---|---|---|
| 1 | 2 | 0.87:1 | 38 |
| 2 | 4 | 1.74:1 | 70 |
| 3 | 6 | 2.61:1 | 95 |
| 4 | 8 | 3.48:1 | 93 |

[1] Based on total monomers charged.
NOTE.—EO=ethylene oxide.

These data show that higher conversions are obtained when the mole ratio of ethylene oxide to butyllithium is in excess of 1:1.

EXAMPLE III

The following recipe was employed for the production of a butadiene/epsilon-caprolactone block copolymer:

TABLE V

Step 1:
  Cyclohexane, parts by weight _____ 780
  1,3-butadiene, parts by weight _____ 20
  n-Butyllithium, mhm. _____ 2.1
  Temperature, ° F. _____ 158
  Time, hours _____ 3
Step 2:
  Ethylene oxide, mhm. _____ 6
  Epsilon-caprolactone, parts by weight ___ 80
  Temperature, ° F. _____ 158
  Time, hours _____ 24
  Conversion percent, based on total monomers charged _____ 73

TABLE V—Continued

Tensile [1], p.s.i. _____ 3790
Elongation [1], percent _____ 530

[1] Polymer recovered, compounded, cured, and tested as in Example I.

The cured product was a tough, leathery material. It had a high tensile strength. The 73 percent conversion shows that a substantial amount of the caprolactone was polymerized.

EXAMPLE IV

A series of block copolymers was prepared from butadiene and epsilon-caprolactone using variable ratios of monomers and n-butyllithium as the catalyst. The procedure was the same as in Example I. The products were compounded and cured as in Example I and tensile strength and elongation were determined as in Example I. Samples of products from runs 2 and 3 were extracted with acetone and also with cyclohexane. Polymerization recipes and results were as follows:

TABLE VI

| | 1 | 2 | 3 | 4 |
|---|---|---|---|---|
| Step 1: | | | | |
| Cyclohexane, parts by weight | 780 | 780 | 780 | 780 |
| 1,3-butadiene, parts by weight | 40 | 50 | 60 | 70 |
| n-Butyllithium, mhm | 2.5 | 2.5 | 2.5 | 2.5 |
| Temperature, °F | 158 | 158 | 158 | 158 |
| Time, hours | 1.5 | 1.5 | 1.5 | 1.5 |
| Step 2: | | | | |
| Ethylene oxide, mhm | 4 | 4 | 4 | 4 |
| Epsilon-caprolactone, parts by weight | 60 | 50 | 40 | 30 |
| Temperature, °F | 158 | 158 | 158 | 158 |
| Time, hours | 24 | 24 | 24 | 24 |
| Conversion, percent, based on total monomers charged | 96 | 95 | 94 | 88 |
| Tensile, p.s.i. | 1,995 | 1,090 | 530 | 245 |
| Elongation, percent | 435 | 405 | 560 | 410 |
| Extraction, percent extracted: | | | | |
| Acetone | | 5.5 | 3.0 | |
| Cyclohexane | | 97.5 | 73.7 | |

The data in Example IV indicate that, from a high monomer conversion, block copolymers were obtained.

The extraction process employed with both acetone and cyclohexane in runs 2 and 3 of Table VI was the same and consisted of providing a 2 gram sample of the polymer, supporting the sample in a porous holder, providing 100 milliliters of the boiling solvent, i.e. acetone at about 56.5° C. and cyclohexane at about 81.4° C., and continuously recycling the boiling solvent through the sample containing support for 48 hours. At the end of the 48 hours the sample was removed from the porous support and weighed and the difference in weight of the sample before the extraction process and after the extraction process determined and expressed as the percent extracted.

To confirm that the polymers produced by runs 2 and 3 of Table VI were block copolymers at 50/50 weight blend of a homopolymer of epsilon-caprolactone and a homopolymer of butadiene was prepared by dissolving 15 grams of each homopolymer in 400 milliliters of chloroform and solution blending by stirring the solution at 158° F. for 18 hours. Thereafter, the chloroform was evaporated and the remaining solution blended polymers dried in an oven. This solution blend was extracted with acetone using the same procedures as set forth hereinabove for runs 2 and 3 of Table VI except that the extraction time was increased to 96 hours because a portion of the blend sample was continuously extracted up to this time whereas with the block copolymers of runs 2 and 3 extraction was substantially complete after 48 hours and it would have been useless to extend the extraction time to 96 hours. The amount of the solution blend sample extracted was 44.1 weight percent as opposed to 5.5 weight percent and 3 weight percent of runs 2 and 3 of Table VI. Thus, it is clear that the polymer produced by the process of this invention is a lactone polymer connected to the base polymer and not simply a mixture of two separate polymers. Since the lactone is polymerized after substantially all of the base polymer is formed, the polymer resulting from this invention must be a block copolymer.

The homopolymer of epsilon-caprolactone used in forming the blend of poly(epsilon-caprolactone) and polybutadiene was formed using the following recipe:

Cyclohexane, parts by weight _____ 780
Epsilon-caprolactone, parts by weight _____ 100
n-Butyllithium, mhm. _____ 8
Temperature, °F. _____ 158
Time, hours _____ 25
Conversion percent, based on total monomers charged _____ 100

The cyclohexane was charged initially followed by nitrogen purge after which the epsilon-caprolactone was charged and thereafter the n-butyllithium was charged. At the conclusion of the polymerization the reaction was terminated with one part per one hundred parts of polymer of 2,2'-methylene-bis(4-methyl-6-tert-butylphenol) as a 10 weight percent solution in a mixture of equal volume parts of isopropyl alcohol and toluene.

The polybutadiene employed in the blend of polycaprolactone and polybutadiene was prepared by polymerizing 1,3-butadiene with n-butyllithium to a Mooney value (ML-4 at 212° F.) of 45.

EXAMPLE V

A dilithium compound composed of a lithium-isoprene adduct commercially produced by the Lithium Corporation of America under the name DiLi-I was employed as initiator for preparing a block copolymer from butadiene and epsilon-caprolactone in accordance with this invention. The block copolymer produced by the use of this dilithium initiator contained a central block of butadiene and terminal blocks at either end of this central block of poly(epsilon-caprolactone). The polymerization recipe and recipe and results were as follows:

TABLE VII

Step 1:
    Cyclohexane, parts by weight _____ 390
    1,3-butadiene, parts by weight _____ 50
    Lithium-isoprene adduct, mhm. _____ 3
    Temperature, °F. _____ 122
    Time, hours _____ 2
Step 2:
    Ethylene oxide, mhm. _____ 12
    Temperature, °F. _____ 158
    Time, hours _____ 4
    Tetrahydrofuran, parts by weight _____ 444
    Epsilon-caprolactone, parts by weight _____ 50
    Temperature, °F. _____ 158
    Time, hours _____ 24
    Conversion percent, based on total monomers charged _____ 91
    Tensile [1], p.s.i. _____ 1640
    Elongation [1], percent _____ 460

[1] Polymer recovered, compounded, cured, and tested as in Example I.

These data show that a high monomer conversion was obtained using a dilithium initiator.

EXAMPLE VI

Runs were conducted for the production of block copolymers of butadiene and epsilon-caprolactone using n-butyllithium as the polymerization catalyst. Different alkene oxides were used to terminate the butadiene polymerization prior to addition of the lactone. A control run was made in which no alkene oxide was added. The recipe was as follows:

TABLE VIII

Step 1:
    Cyclohexane, parts by weight _____ 780
    1,3-butadiene, parts by weight _____ 50
    n-Butyllithium, mhm. _____ Variable
    Temperature, °F. _____ 158
    Time, minutes _____ 60

TABLE VIII—Continued

Step 2:
  Alkene oxide, mhm. _____ Variable
  Temperature, °F. _____ [1] 78
  Time, minutes _____ 30
Step 3:
  Epsilon-caprolactone, parts by weight _____ 50
  Temperature, °F. _____ 158
  Time, hours _____ [2] 23–25

[1] Mixture allowed to stand at room temperature (about 78° F.) for 30 minutes.
[2] Epichlorohydrin runs, 23 hours, propylene oxide runs, 25 hours.

The procedure was the same as in Example I. Results were as follows:

TABLE IX

| Run No. | n-BuLi, mhm. | Alkene oxide Type | Alkene oxide Mhm. | Conversion, percent |
|---|---|---|---|---|
| 1 | 3 | | | 50 |
| 2 | 3 | Ethylene oxide | 9 | 90 |
| 3 | 3 | Propylene oxide | 3 | 96 |
| 4 | 3 | ...do... | 9 | 97 |
| 5 | 4 | ...do... | 4 | 90 |
| 6 | 4 | ...do... | 12 | 93 |
| 7 | 3 | Epichlorohydrin | 9 | 95 |
| 8 | 4 | ...do... | 12 | 85 |

The products were white solids. The data show that conversion was much higher in the runs made according to the invention.

EXAMPLE VII

Four styrene - butadiene - epsilon - caprolactone block terpolymers were prepared according to this invention. The recipe was as follows:

TABLE X

Step 1:
  Cyclohexane, parts by weight _____ 780
  Styrene, parts by weight _____ 45
  sec-Butyllithium, mhm. _____ Variable
  Temperature, °F. _____ 158
  Time, minutes _____ 60
Step 2:
  1,3-butadiene, parts by weight _____ 10
  Temperature, °F. _____ 158
  Time, minutes _____ 90
Step 3:
  Ethylene oxide, mhm. _____ 8
  Epsilon-caprolactone, parts by weight _____ 45
  Temperature, °F. _____ 158
  Time, hours _____ 24

TABLE XI

| | 1 | 2 | 3 | 4 |
|---|---|---|---|---|
| sec-Butyllithium, mhm | 2.7 | 2.9 | 3.1 | 3.3 |
| Conversion, percent | 95 | 100 | 95 | 98 |

The products were plastic materials. They were blended and the blend was analyzed. Results of analytical tests were as follows:

TABLE XII

Melt Index, 190° C., g./min.[1] _____ 0.02
Density, g./cc. at 25° C. _____ 1.0765
Flexural modulus, p.s.i.×10⁻³ [2] _____ 140
Tensile at break, p.s.i.[3] _____ 3460
Elongation, percent _____ 409
Notched Izod impact, ft. lbs./in.[4] _____ 0.34

[1] ASTM D 1238–62T, Condition E, 2160 g.
[2] ASTM D 790–63.
[3] ASTM D 638–61T, crosshead speed 20 in./min.
[4] ASTM D 256–56, 75° F.

EXAMPLE VIII

Two styrene - butadiene-epsilon-caprolactone terpolymers, 20–20–60 and 20–60–20, were prepared in accordance with the following recipes:

| | 1 | 2 |
|---|---|---|
| Step 1: | | |
| Cyclohexane, parts by weight | 780 | 468 |
| Styrene, parts by weight | 20 | 20 |
| sec-Butyllithium, mhm. | 2.5 | 2.5 |
| Temperature, °F. | 158 | 158 |
| Time, minutes | 60 | 60 |
| Step 2: | | |
| 1,3-butadiene, parts by weight | 20 | 60 |
| Temperature, °F. | 158 | 158 |
| Time, minutes | 90 | 90 |
| Step 3: | | |
| Ethylene oxide, mhm | 8 | 8 |
| Cyclohexane, parts by weight | | 312 |
| Epsilon-caprolactone, parts by weight | 60 | 20 |
| Temperature, °F. | 158 | 158 |
| Time, hours | 24 | 26 |
| Conversion, percent | 97 | 99 |
| Type of product | (¹) | Rubber |

[1] Thermoplastic.

The product from run 1 had a green tensile strength of 4200 p.s.i. and an elongation of 640 percent (ASTM D 412–62T; Scott Tensile Machine L–6; tests made at 80° F.).

The rubbery product from run 2 was compounded in accordance with the following recipe:

TABLE XIV

| | Parts by weight |
|---|---|
| Block terpolymer | 100 |
| Fast extruding furnace black (Philblack A) | 30 |
| Zinc oxide | 3 |
| 2,2′ - methylene-bis(4-methyl-6-tert-butylphenol) | 0.5 |
| Stearic acid | 1 |
| Aromatic oil (Philrich 5) | 10 |
| Sulfur | 1.75 |
| N - cyclohexyl-2-benzothiazolesulfenamide | 1.2 |

The composition was cured 15 minutes at 307° F. and physical properties determined. Results were as follows:

TABLE XV

Modulus, p.s.i.[4] _____ 940
Tensile, p.s.i.[1] _____ 1800
Elongation, percent [1] _____ 620
Resilience, percent [2] _____ 67
Shore A hardness, 80° F.[3] _____ 61

[1] As in Example I.
[2] ASTM D945–59.
[3] ASTM D1706–61; Shore Durometer, Type A.
[4] As in Example VII.

EXAMPLE IX

Block copolymers of butadiene and epsilon-caprolactone were prepared in a series of runs using diepoxides rather than monoepoxides as in previous examples.

TABLE XVI

Step 1:
  Cyclohexane, parts by weight _____ 780
  1,3-butadiene, parts by weight _____ 50
  n-Butyllithium, mhm. _____ 5
  Temperature, °F. _____ 158
  Time, min. _____ 75
Step 2:
  Diepoxide, mhm. _____ 5
  Temperature, °F. _____ 158
  Time, min. _____ 30
Step 3:
  Epsilon-caprolactone, parts by weight _____ 50
  Temperature, °F. _____ 158
  Time, hours _____ 24

The charging procedure and method of recovery of the products were the same as in Example I except that the diepoxide was allowed to react under conditions shown in Step 2 of Table XVI before the lactone was added. Results were as follows:

TABLE XVII

| Run No. | Diepoxide | Conversion percent [1] |
|---|---|---|
| 1 | 1,2:8,9-diepoxy-p-menthane | 97.5 |
| 2 | 2,3:5,6-diepoxyhexahydro-4,7-methanoindane | 98.5 |

[1] See Table IV.

It can be seen from Table XVII that diepoxides also can be employed in the preparation of copolymers according to this invention.

EXAMPLE X

Two runs were made in which a polyepoxide, i.e. a compound containing more than two oxirane groups, was employed in the preparation of butadiene epsilon-caprolactone block copolymers. The polyepoxide employed can be named as follows: glycerol, 1-(9,10:12,13:15,16-triepoxyoctadecanoate) - 2 - (9,10:12,13 - diepoxyoctadecanoate)-3-(9,10-epoxyoctadecanoate). The polymerization recipe was as shown in Table XVIII.

TABLE XVIII

Step 1:
    Cyclohexane, parts by weight _____ 780
    1,3-butadiene, parts by weight _____ 50
    n-Butyllithium, mhm. _____ Variable
    Temperature, ° F. _____ 158
    Time, minutes _____ 60
Step 2:
    Polyepoxide, parts by weight _____ Variable
    Temperature, ° F. _____ 122
    Time, minutes _____ 30
Step 3:
    Epsilon-caprolactone, parts by weight _____ 50
    Temperature, ° F. _____ 158
    Time, hours _____ 24

The charging procedure and method of recovery of the polymer were the same as that of Example I except that the polyepoxide was allowed to react under conditions shown in Step 2 of Table XVIII before the lactone was added. The results are shown in Table XIX.

TABLE XIX

| Run No. | BuLi, mhm. | Polyepoxide, parts by weight | Conversion, percent [1] |
|---|---|---|---|
| 1 | 6.0 | 0.86 | 95 |
| 2 | 7.5 | 1.07 | 95 |

[1] See Table IV.

It can be seen from Table XIX that polyepoxides also can be employed in the preparation of copolymers according to this invention.

EXAMPLE XI

Runs were conducted showing that a lactone of an unsaturated carboxylic acid can be employed according to this invention in the preparation of a butadiene-lactone block copolymer. The lactone used was the lactone of 2,2,4-trimethyl-3-hydroxy-3-pentenoic acid (beta lactone). The polymerization recipe was as shown in Table XX.

TABLE XX

Step 1:
    Cyclohexane, parts by weight _____ 780
    1,3-butadiene, parts by weight _____ 50
    n-Butyllithium, mhm. _____ 5
    Temperature, ° F. _____ 158
    Time, minutes _____ 75
Step 2:
    Ethylene oxide _____ Variable
    Lactone, parts by weight _____ 50
    Temperature, ° F. _____ 158
    Time, hours _____ 24

The charging and polymer recovery procedures were the same as that of Example I. The results are shown below in Table XXI.

TABLE XXI

| Run No. | Ethylene oxide mhm. | Conversion, percent [1] |
|---|---|---|
| 1 | 0 | 72 |
| 2 | 14 | 95 |

[1] See Table IV.

It is seen from Table XXI that a much higher conversion of the block copolymer was obtained when ethylene oxide was employed in Run No. 2 than in the absence of ethylene oxide in Run No. 1.

EXAMPLE XII

A series of runs was conducted in which mixtures of lactones were employed in the preparation of block copolymers according to this invention. The polymerization recipe was as shown in Table XXII.

TABLE XXII

Step 1:
    Cyclohexane, parts by weight _____ 780
    Styrene, parts by weight _____ 40
    sec-Butyllithium, mhm. _____ 2.1
    Temperature, ° F. _____ 158
    Time, minutes _____ 60
Step 2:
    1,3-butadiene, parts by weight _____ 30
    Temperature, ° F. _____ 158
    Time, minutes _____ 75
Step 3:
    Ethylene oxide, mhm. _____ 8
    Epsilon-caprolactone, parts by weight ____ Variable
    Beta-propiolactone, parts by weight _____ 30
    Temperature, ° F. _____ 158
    Time, hours _____ 24

The charging procedure was the same as that used in Example VII except that beta-propiolactone was charged immediately after the epsilon-caprolactone. Polymer recovery procedure was the same as that used in Example I. The results were as shown in Table XXIII.

TABLE XXIII

| No. | Epsilon-caprolactone, parts by weight | Conversion, percent [1] |
|---|---|---|
| 1 | 2.3 | 94 |
| 2 | 5.6 | 91 |

(1) See Table IV.

Mixtures of lactones can be employed in the preparation of block copolymers according to this invention as seen from Table XXIII.

EXAMPLE XIII

Another series of runs employing mixtures of lactones was conducted under conditions differing from those of Example XII. The polymerization recipe was as shown in Table XXIV.

TABLE XXIV

Step 1:
    Cyclohexane, parts by weight _____ 780
    Styrene, parts by weight _____ 30
    Sec-butyllithium, mhm. _____ Variable
    Temperature, ° F. _____ 158
    Time, minutes _____ 60
Step 2:
    1,3-butadiene, parts by weight _____ 20
    Temperature, ° F. _____ 158
    Time, minutes _____ 90
Step 3:
    Ethylene oxide _____ Variable
    Epsilon-caprolactone, parts by weight ____ Variable

TABLE XXIV—Continued

Beta-propiolactone, parts by weight ----- Variable  
Temperature, ° F. ----------------------- 158  
Time, hours ---------------------------- 24

The charging and polymer recovery procedures were the same as those used in Examples XII and I, respectively, the results were as shown in Table XXV.

TABLE XXV

| Run No. | BuLi, mhm. | Ethylene oxide, mhm. | Epsilon-caprolactone, parts by wt. | Beta-propiolactone, parts by wt. | Conv., percent [1] |
|---|---|---|---|---|---|
| 1 | 2.5 | 8 | 2 | 48 | 95 |
| 2 | 2.5 | 8 | 20 | 30 | 75 |
| 3 | 2.0 | 6 | 2 | 48 | 84 |
| 4 | 2.0 | 6 | 20 | 30 | 73 |

[1] See Table IV.

It is again seen from Table XXV that mixtures of lactones can be employed in making block copolymers according to this invention.

EXAMPLE XIV

Another series of runs was conducted in which two different lactones were employed as in Examples XII and XIII but in which the first lactone added was polymerized essentially to completion prior to addition of the second lactone. The polymerization recipe was as shown in Table XXVI.

TABLE XXVI

Step 1:
    Cyclohexane, parts by weight --------------- 780  
    Styrene, parts by weight ------------------- 30  
    Sec-butyllithium, mhm. --------------------- 2.0  
    Temperature, ° F. ------------------------- 158  
    Time, minutes ----------------------------- 60  
Step 2:
    1,3-butadiene ----------------------------- 20  
    temperature, ° F. ------------------------- 158  
    Time, minutes ----------------------------- 90  
Step 3:
    Ethyleene oxide, mhm. --------------------- 8  
    Epsilon-caprolactone, parts by weight ---- Variable  
    Temperature, ° F. ------------------------- 158  
    Time, hours ------------------------------- 17  
Step 4:
    Beta-propiolactone, parts by weight ---- Variable  
    Temperature, ° F. ------------------------- 158  
    Time, hours ------------------------------- 24

The charging procedure was the same as that of Example XII with the exception that the addition of beta-propiolactone was made after the epsilon-caprolactone was essentially completely polymerized. Polymer recovery procedure was the same as that employed in Example I. The results were as shown in Table XXVII.

TABLE XXVII

| Run No. | Epsilon-caprolactone, parts by weight | Beta-propiolactone, parts by weight | Conversion percent [1] |
|---|---|---|---|
| 1 | 20 | 30 | 91 |
| 2 | 30 | 20 | 94 |

[1] See Table IV.

It is seen from Table XXVII that different lactones can be added and polymerized in a sequential fashion in the preparation of block copolymers according to this invention.

EXAMPLE XV

A run was made showing the formation of a styrene/epsilon-caprolactone block copolymer according to this invention. The polymerization recipe was as shown in Table XXVIII.

TABLE XXVIII

Step 1:
    Cyclohexane, parts by weight --------------- 780  
    Styrene, part by weight -------------------- 50  
    sec-Butyllithium, mhm. --------------------- 2.5  
    Temperature, ° F. ------------------------- 158  
    Time, minutes ----------------------------- 60  
Step 2:
    Ethylene oxide, mhm. ---------------------- 8  
    Epsilon-caprolactone, parts by weight ----- 50  
    Temperature, ° F. ------------------------- 158  
    Times, minutes ---------------------------- 26

The charging and polymer recovery procedures were the same as those employed in Example I. Conversion in the run of Example XV was 90 percent based on total mnoomers charged from which it is seen that monovinyl aromatic compounds can be employed in the absence of conjugated dienes in the preparation of copolymers according to this invention.

EXAMPLE XVI

Runs were conducted in which the ratios of styrene/butadiene/epsilon-caprolactone were varied in preparing block copolymers according to this invention. The polymerization recipe was as shown in Table XXIX.

TABLE XXIX

Step 1:
    Cyclohexane, parts by weight --------------- 468  
    Styrene, parts by weight ---------------- Variable  
    Sec-butyllithium, mhm. --------------------- 2.3  
    Temperature, ° F. ------------------------- 158  
    Time, minutes ----------------------------- 60  
Step 2:
    1,3-butadiene, parts by weight ---------- Variable  
    Temperature, ° F. ------------------------- 158  
    Times, minutes ---------------------------- 90  
Step 3:
    Ethylene oxide, mhm. ---------------------- 8  
    Epsilon-carprolactone, parts by weight -- Variable  
    Cyclohexane, parts by weight -------------- 312  
    Temperature, ° F. ------------------------- 158  
    Times, hours ------------------------------ 24

The charging and polymer recovery procedures were the same as those used in Examples VII and I, respectively. The results were as shown in Table XXX.

TABLE XXX

| | Parts by weight | | | |
|---|---|---|---|---|
| Run No. | Styrene | Butadiene | Epsilon-caprolactone | Conversion, percent [1] |
| 1 | 60 | 10 | 30 | 97 |
| 2 | 30 | 10 | 60 | 97 |

[1] See Table IV.

It is seen from Table XXX that the composition of the monovinyl aromatic compound/conjugated diene portion of block copolymers of this invention can vary over a very wide range.

EXAMPLE XVII

A series of isoprene/epsilon-caprolactone block copolymers was prepared according to this invention. The polymerization recipe was as shown in Table XXXI.

TABLE XXXI

Step 1:
    Cyclohexane, parts by weight --------------- 780  
    Isoprene, parts by weight ------------------ 50  
    n-Butyllithium, mhm. ------------------- Variable  
    Temperature, ° F. ------------------------- 158  
    Time, minutes ----------------------------- 60  
    Ethylene oxide, mhm. ------------------- Variable  
    Epsilon-caprolactone, parts by weight ------ 50  
    Temperature, ° F. ------------------------- 158  
    Time, hours ------------------------------- 24

The charging and polymer recovery procedures were the same as those used in Example I. The results were shown in Table XXXII.

TABLE XXXII

| Run No. | BuLi, mhm. | Ethylene oxide, mhm. | Conversion, percent [1] |
|---|---|---|---|
| 1 | 3.0 | 10 | 95 |
| 2 | 2.5 | 8 | 100 |
| 3 | 2.0 | 6 | 93 |

[1] See Table IV.

Conjugated dienes other than 1,3-butadiene can be employed for the preparation of block copolymers according to this invention as seen from Table XXXII.

EXAMPLE XVIII

A run was conducted in which a styrene/isoprene/epsilon-caprolactone block copolymer was prepared according to this invention. The polymerization recipe was as shown in Table XXXIII.

TABLE XXXIII

Step 1:
    Cyclohexane, parts by weight _____ 780
    Styrene, parts by weight _____ 40
    sec-Butyllithium, mhm. _____ 2.9
    Temperature, ° F. _____ 158
    Time, minutes _____ 60
Step 2:
    Isoprene, parts by weight _____ 30
    Temperature, ° F. _____ 158
    Times, minutes _____ 90
Step 3:
    Ethylene oxide, mhm. _____ 8
    Epsilon-caprolactone, parts by weight _____ 30
    Temperature, 0° F. _____ 158
    Times, hours _____ 24

Charging procedure employed was the same as given in Example VII. Polymer recovery was the same as in Example I. Conversion in the run of Example XVIII was 98 percent based on total monomers charged from which it is seen that conjugated dienes other than butadiene can be employed in making monovinyl aromatic compound/conjugated diene/lactone block copolymers of this invention.

EXAMPLE XIX

Butadiene-1,3 and epsilon-caprolactone were polymerized in a series of runs using 1,3,5-trioxane, propanal, or 2,3-epoxypropanal as cocatalysts.

In these runs cyclohexane was charged to the reactor first and purged with nitrogen. Butadiene was added followed by n-butyllithium and the temperature adjusted to 70° C. for agitation at this temperature for 1 to 1.5 hours. At the end of this reaction period, the temperature was adjusted to room temperature and the cocatalyst added. The reaction mixture was then agitated at 70° C. for 0.3 hour. If no cocatalyst was added, the mixture was allowed to stand at room temperature for 0.3 hour. Epsilon-caprolactone was added next and the mixture agitated at 70° C. for 24 hours.

At the end of each polymerization run, the reaction was shortstopped with a 10 weight percent solution of 2,2'-methylene-bis(4-methyl-6-tert-butylphenol) in an isopropyl alcohol/toluene (50/50 by volume) mixture. The amount used was sufficient to provide one part by weight of the antioxidant per 100 parts by weight of monomers charged.

The polymerization recipe and results for these runs are shown in the following table.

TABLE XXXIV

1. Conditions—polymerization recipe:
    Cyclohexane _____parts by weight__ 780
    Butadiene _____do____ 50
    Epsilon-caprolactone _____do____ 50
    n-Butyllithium _____mhm.[1]__ Variable
    Cocatalyst _____mhm.[1]__ Variable
2. Results:

| Run No. | n-Butyllithium, mhm.[1] | Cocatalyst Name | Mhm.[1] | Conversion, percent |
|---|---|---|---|---|
| 1 | 5 | | | 50 |
| 2 | 3 | | | 50 |
| 3 | 4 | Propanal | 4 | 96 |
| 4 | 4 | 1,3,5-trioxane | 12 | 76 |
| 5 | 4 | 2,3-epoxypropanal | 4 | 88 |

[1] Millimoles per 100 grams of monomer charged.

The results show the beneficial effect of these cocatalysts in increasing conversion at reduced catalyst levels. The nature of the products from these runs also reflected this effect. If no cocatalyst was present the products were viscous liquids while the products from runs using the above cocatalysts were white solids with rubbery characteristics.

EXAMPLE XX

Butadiene-1,3 and epsilon-caprolactone were polymerized in a series of runs using methyl isobutyl ketone or benzophenone as cocatalysts.

In these runs, cyclohexane was charged to the reactor first and purged with nitrogen. Butadiene was added followed by n-butyllithium and the temperature adjusted to 70° C. for agitation at this temperature for one hour. At the end of this reaction period, the temperature was adjusted to room temperature and the cocatalyst added. The reaction mixture was then agitated at 70° C. for 0.3 hour. If no cocatalyst was added, the mixture was allowed to stand at room temperature for 0.3 hour. Epsilon-caprolactone was added next and the mixture agitated at 70° C. for 26 hours.

At the end of each polymerization run, the reaction was shortstopped with a 10 weight percent solution of 2,2'-methylene-bis(4-methyl-6-tert-butylphenol) in an isopropyl alcohol/toluene (50/50 by volume) mixture. The amount used was sufficient to provide one part by weight of the antioxidant per 100 parts by weight of monomers charged.

The polymerization recipe and results for these runs are shown in the following table.

TABLE XXXV

1. Conditions—polymerization recipe:
    Cyclohexane _____parts by weight__ 780
    1,3-Butadiene _____do____ 50
    Epsilon-caprolactone _____do____ 50
    Ketone (cocatalysts) _____mhm.[1]__ Variable
    n-Butyllithium _____mhm.[1]__ Variable
    Temperature, ° C. _____ 70
    Time, hours (total) _____ 27.3
2. Results:

| Run No. | Cocatalyst Name | Mhm.[1] | n-BuLi mhm.[1] | Conversion, percent |
|---|---|---|---|---|
| 1 | None | | 3 | 5[a] |
| 2 | do | | 4 | [2]88 |
| 3 | Methyl isobutyl ketone | 4 | 4 | [3]92 |
| 4 | Benzophenone | 9 | 3 | [4]100 |

[1] Millimoles per 100 grams of monomer charged.
[2] The product was a sticky gum.
[3] The product was a white solid.
[4] The product was a viscous liquid.

The above results show that ketones have the same beneficial effect of increasing monomer conversion at reduced catalyst level.

Reasonable variations and modifications are possible within the scope of this disclosure without departing from the spirit and scope thereof.

We claim:

1. In a method for making a block copolymer, the improvement comprising: (1) providing a base polymer formed from monomers selected from the group consisting of conjugated dienes having 4 to 12 carbon atoms per molecule, inclusive, and monovinyl-substituted aromatic compounds having 8 to 12 carbon atoms per molecule, inclusive, having at least one C—Li group per polymer molecule; (2) reacting said base polymer with a compound selected from the group consisting of an aldehyde, a polyaldehyde, and a ketone to form a reaction product; the amount of said aldehyde, polyaldehyde, or ketone employed being at least 0.1 to about 10.0 mols per gram atom of lithium contained in said base polymer; and (3) contacting said reaction product with at least one lactone of the formula

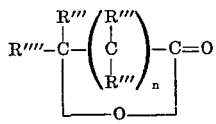

wherein $R''''$ is one of hydrogen and a radical of the formula

and when $R''''$ is a radical as specified no $R'''$ is attached to the carbon atom to which the radical is attached, $R'''$ is selected from the group consisting of hydrogen, alkyl, cycloalkyl, alkenyl, cycloalkenyl, aryl, and combinations thereof, the total carbon atoms in the $R'''$ and $R''''$ substituents being in the range of 1 to 12, and $n$ being an integer of 1, 3, or 4, the contacting step of (3) being carried out in the presence of amounts of lactone and under conditions sufficient to cause polymerization of said at least one lactone to form at least one lactone polymer portion of at least a part of the polymer molecules of said base polymer.

2. The method according to claim 1 wherein said base polymer is formed by use of a catalyst of the formula $R^V Li_x$ wherein $R^V$ is selected from the group consisting of alkyl, cycloalkyl, and aryl, $x$ is an integer from 1 to 4, inclusive, $R^V$ has a valence equal to the integer, and contains from 1 to 20 carbon atoms, inclusive.

3. The method according to claim 1 wherein the amount of said at least one lactone employed is from about 1 to about 99 weight percent based on the total weight to said at least one base polymer and said at least one lactone, the lactone polymerization temperature is from about −20 to about 300° F., and the lactone polymerization step is carried out in the presence of at least one diluent selected from the group consisting of paraffins, cycloparaffins, and aromatic compounds having from 4 to 10 carbon atoms per molecule, inclusive, and ethers having from 2 to 6 carbon atoms per molecule, inclusive.

4. The method according to claim 1 wherein said base polymer is a homopolymer of one of 1,3-butadiene and isoprene formed by polymerizing the monomer with an alkyllithium wherein the alkyl contains 1 to 20 carbon atoms, inclusive, said homopolymer is reacted with a compound of the group propanal; 1,3,5-trioxane; methyl isobutyl ketone; and benzophenone at a temperature in the range of from about 30 to about 250° F., and one of beta-propiolactone; delta-valerolactone; epsilon-caprolactone; and a lactone of 2,2,4-trimethyl-3-hydroxy-3-pentenoic acid is contacted with the reaction mixture of said homopolymer and said above mentioned compounds at a temperature in the range of from about 30 to about 250° F. for a time sufficient to polymerize at least a part of said lactone.

5. The method according to claim 4 wherein said homopolymer is formed from 1,3-butadiene formed by polymerizing same with a butyllithium initiator, one of propanal; 1,3,5 - trioxane; methyl isobutyl ketone; and benzophenone is reacted with said homopolymer, and epsilon-caprolactone is contacted with the reaction mixture of said homopolymer and said propanal; 1,3,5-trioxane; methyl isobutyl ketone; or benzophenone.

6. The method according to claim 1 wherein said base polymer is a block copolymer composed of a homopolymer block of butadiene and a homopolymer block of styrene and said base polymer is reacted with epsilon-caprolactone so that a homopolymer block of the lactone is attached to the end of the butadiene homopolymer block that is not attached to the styrene homopolymer block.

References Cited
UNITED STATES PATENTS

| | | | |
|---|---|---|---|
| 3,055,952 | 9/1962 | Goldberg | 260—635 |
| 3,021,314 | 2/1962 | Cox et al. | 260—78.3 |
| 3,169,945 | 2/1965 | Hostettler et al. | 260—78.3 |
| 3,269,978 | 8/1966 | Short et al. | 260—94.7 |
| 3,379,794 | 4/1968 | King et al. | 260—898 |
| 3,418,393 | 12/1968 | King | 260—857 |

JAMES A. SEIDLECK, Primary Examiner

U.S. Cl. X.R.

260—66 R, 73 R, 78.3 R, 94.7 A, 874 R, 887 R